Oct. 15, 1940.  T. N. FRITZSCH  2,218,261
TRUCK
Filed April 21, 1939   2 Sheets-Sheet 1
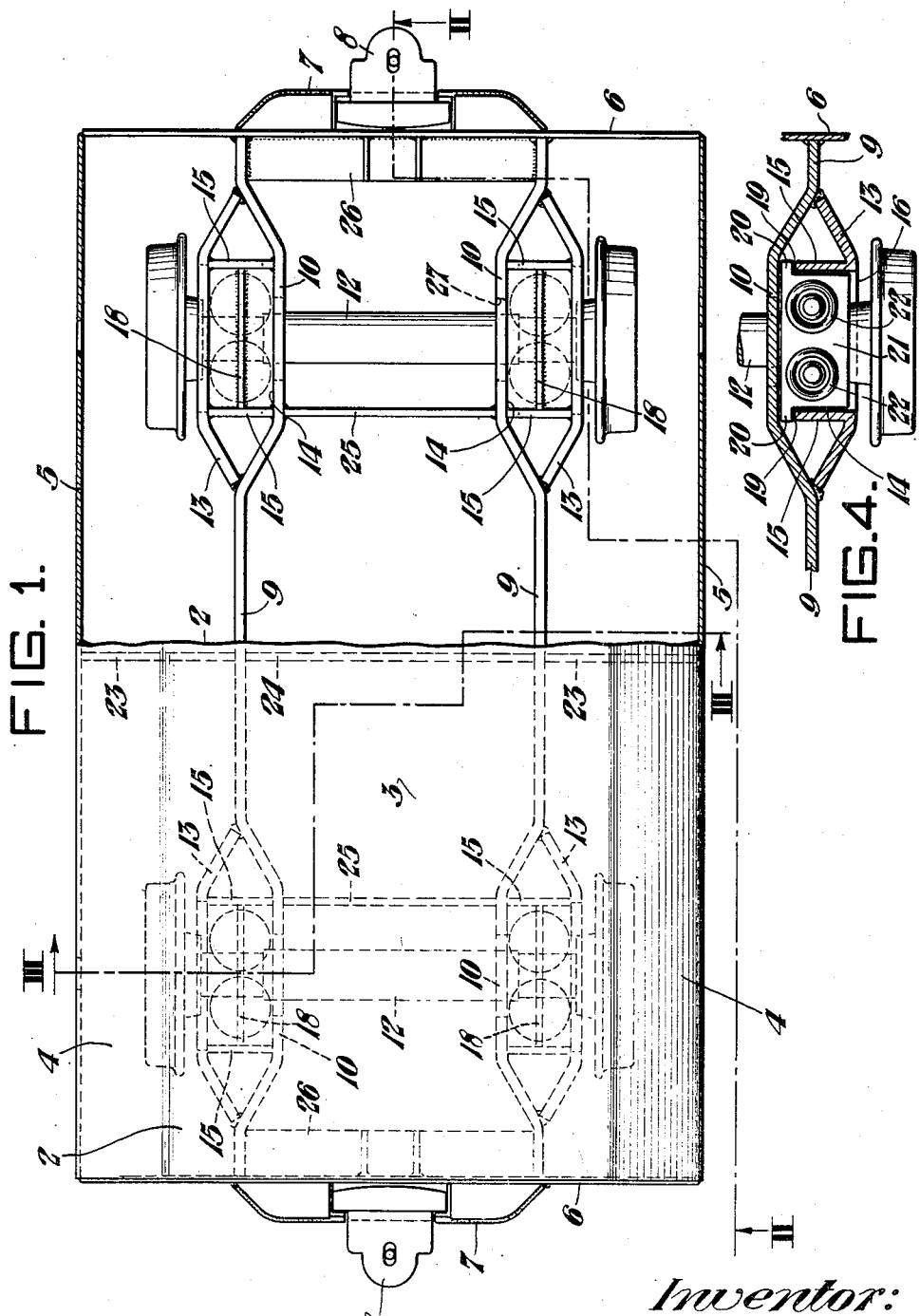
Inventor:
THEODORE N. FRITZSCH,
by: John E. Jackson
his Attorney.

Oct. 15, 1940.  T. N. FRITZSCH  2,218,261
TRUCK
Filed April 21, 1939  2 Sheets-Sheet 2
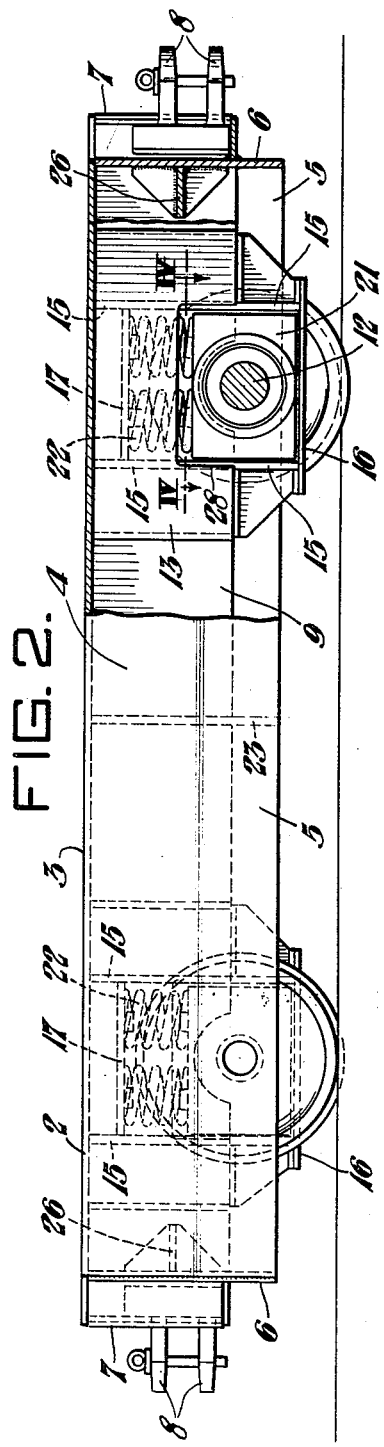
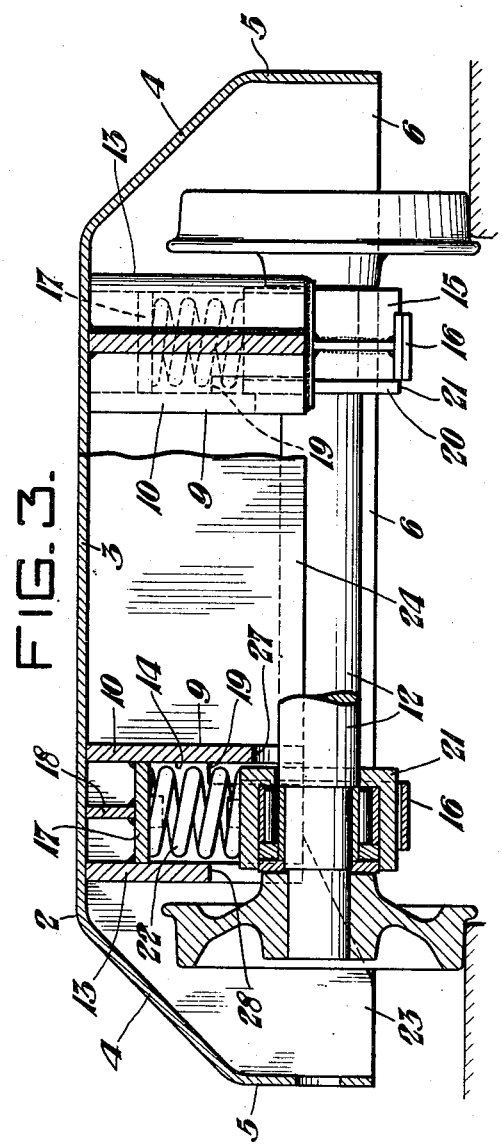
Inventor:
THEODORE N. FRITZSCH,
by: John E. Jackson
his Attorney Patented Oct. 15, 1940

2,218,261

UNITED STATES PATENT OFFICE 2,218,261

TRUCK

Theodore N. Fritzsch, Johnstown, Pa.

Application April 21, 1939, Serial No. 269,262

8 Claims. (Cl. 105—157)

This invention relates to trucks, and, particularly, to an improved railroad car or truck as is used especially for transporting steel ingot molds and charging boxes in the steel industry.

Generally, cars or trucks that are employed for transporting ingot molds, charging boxes, and other extremely heavy objects and articles from one point to another in a steel manufacturing plant, as is well known to those engaged therein, are of a limited length so as to enable them to take a small radius curve or turn without the aid of auxiliary car trucks; in fact, such cars or trucks are about the same size as the railroad trucks ordinarily employed for supporting each end of a regular size railroad car. In such ingot mold or charging box trucks or cars, the load thereon is supported through four points, namely, by the spring seats; while, in the ordinary railroad cars which are relatively long, the load is supported through two points, namely, by the truck bolster plates.

The ingot mold or charging box truck or car of the type to which the present invention relates usually has the two points of support on each side of the car interconnected by a structural member running the length thereof, such members being commonly called the side sills. Such a car or truck, in general, consists usually of two such side sills, four spring seats, two end sills, and a flat top plate or body member. The height of such a car, in most cases, is limited for various reasons, and this factor in the past has led to difficulties in providing sufficient room for the spring seats, the springs, the journal boxes, and the journal box guides thereunder, especially in view of the fact that the side sills are usually underslung to such a great degree for the reason that they are generally made as large as possible in order to carry the extreme loads to which they are subjected.

Heretofore, in order that the height of the car be at a minimum or within any given height, the spring seats or housings and journal box guides were usually positioned on either side of the side sills, such side sills usually being a straight I-beam or some similar structural member. But a car or truck of such construction was unsatisfactory in that the loads thereon were not properly transmitted to the main points of support; that is, directly to the side sills, but to either side of them. Also, in such a construction, the loads caused eccentric loading of the side sills and eventual bending thereof which, of course, necessitated heavier side sills or additional reenforcing cross-members in the car construction.

In cars or trucks of other constructions, the side sills were usually interrupted; that is, a portion thereof was eliminated or cut away in order to receive and accommodate the spring seat and journal box guides, or, sometimes, a housing was provided therefor and positioned therein, and additional structural members running parallel to the side sills were provided to support the same. Although the loads in cars or trucks of such construction were supported by the spring supports which were in line with the side sills, additional structural members had to be provided, as stated, in order to support the loads transmitted to the spring seats or housings. The cutting away of the side sills, or interrupting of the same for such purposes, weakened the same and also additional strengthening cross-members had to be provided. Thus, it will be seen that cars constructed in such a manner required an excessive number of parts, and were expensive to construct and assemble.

According to the present invention, there is provided a car or truck for transporting ingot molds and charging boxes in which all of the above disadvantages have been eliminated and a car in which the number of parts have been reduced to a minimum.

Accordingly, it is one of the objects of the present invention to provide an improved car or truck for transporting ingot molds, charging boxes and the like which is simple and inexpensive in its construction and, yet, one which is strong and rugged.

It is another object of the invention to provide an improved car or truck for transporting ingot molds, charging boxes and the like which has a minimum height and, consequently, one in which the center of gravity is as low as possible.

It is a further object of the invention to provide an improved car or truck for transporting ingot molds, charging boxes and the like which is of an entirely welded construction and one in which the loads thereon are transmitted directly to the side sills thereof.

Various other objects and advantages of this invention will be more apparent in the course of the following specification and will be particularly pointed out in the appended claims.

In the accompanying drawings there is shown, for the purpose of illustration, one embodiment which my invention may assume in practice.

In these drawings:

Figure 1 is a plan, partly in section, of the improved truck or car of my invention;

Figure 2 is a section taken on the line II—II of Figure 1;

Figure 3 is a section taken on the line III—III of Figure 1; and,

Figure 4 is a section taken on the line IV—IV of Figure 2.

Referring more particularly to the drawings, the improved car or truck of my invention comprises a body member 2 having a horizontally disposed flat upper load-receiving portion 3, angular side portions 4 which terminate in vertically extending side apron portions 5, and end sills 6. There is arranged on the outer surface of each of the end sills 6 at each end of the truck, an angular-shaped member 7, each of which is adapted to house a car coupling member 8.

According to the present invention, there is attached to the bottom side of the flat portion 3 of the body member 2 and extending longitudinally thereof, a pair of spaced-apart parallel side sills 9. Each of these side sills consists of a suitable plate member extending substantially the length of the body member 2 having laterally offset portions 10 arranged therein above each of the axles 12 of the car, namely, four in number. There is also disposed on the bottom side of the body member 2 opposite each of the offset portions 10 of the side sills 9 and spaced therefrom, a plate member 13 which is similar in shape to the offset portions 10. The plate members 10 and 13 are spaced apart by means of a pair of vertically disposed plate members 15 which are adapted to extend a substantial distance below the side sills and have a horizontal plate 16 securely arranged across the bottom ends thereof. The plate members 15, the offset portions 10 of the side sills 9, and the plate members 13 are constructed and arranged so as to define a rectangular box-like housing 14. There is disposed in the top of each of the housings 14, preferably a horizontally disposed spring seat plate member 17 which is spaced from the bottom side of the flat portion 3 of the body member 2, preferably by means of a centrally positioned plate 18 vertically arranged therebetween.

The lower portion of each of the vertically extending plates 15 preferably is cut away on the inner side thereof as at 19 as shown in Figure 4 so as to receive the flange portions 20 of the respective journal boxes 21 for positioning and guiding the same in their vertical movement in the housing 14. There is arranged between the top side of each of the journal boxes 21 and the plate member 17 in each of the housings 14, preferably a pair of coil springs 22 which are adapted to be compressed when the car or truck is loaded and absorb any shocks to which the same is subjected. Each of the plate members 16 extending across the bottom of the plates 15 is adapted to retain the journal boxes 21 in their respective housings in the event that the car or truck is lifted from the ground or tracks. It is preferable that both the offset portions 10 of the side sills 9 and the plate members 13 be cut away on the bottom side thereof opposite each of the axles 12 of the car, as at 27 and 28, respectively, so as to provide movement for the axles and the journal boxes when the cars are loaded and the springs become compressed.

There is preferably arranged centrally of the car between the side portions 4 and 5 of the body member 2 and each of the side sills, at each side of the truck, a vertically disposed strengthening plate member 23; and there is arranged in alignment therewith and extending between the side sills 9, a similar vertically disposed plate strengthening member 24. There is also positioned between the side sill members, preferably adjacent each of the inner ends of the offset portions 10 thereof, a vertically disposed strengthening plate member 25, and between the side sill members 9 at each end thereof on the inner side of the end sills 6, a horizontally disposed plate strengthening member 26.

While all of the parts may be held together by means of bolts, rivets, or any other suitable mechanical means, it is preferable that all of the parts be held together by means of welding; that is, the entire car or truck is preferably of a welded plate construction. It will be seen then that each of the side sills is a unitary member with the ends thereof overhanging the points of support, that is, the spring seats 17, with the points of support being positioned in alignment with each of the side sills 9; thus, the loading thereon is concentric therewith. It will also be seen that, at the point of maximum stress (i. e., at the center portion of the truck or body member 2), the side sill members are a solid unit and therefore very effective; and, the load at the axles is distributed by having two members, namely the offset portion 10 of the side sills 9 and the plate member 13, absorb the stress.

The improved car or truck of the present invention not only has all of the attributes of a car for such a purpose but it also has the advantage that it can be easily constructed and assembled. It will be understood that after the car body 2 has been formed and all of the structural parts assembled therein and welded thereto, the coil springs 22 are positioned in each of the housings 14 on top of the plate spring seats 17 ready to receive the axle and journal box assemblies. The journal boxes 21 on the axles 12, together with the wheels on each end thereof, are then arranged on the bottom of the truck with the flanges 20 on each of the journal boxes 21 positioned in the respective guide slots 19 of the plates 15 in the housings 14. The plates 16 are then finally welded to the bottom ends of the vertically disposed plates 15 and the car is completely assembled and ready for use.

While I have shown and described one embodiment of my invention, it will be seen that this embodiment is merely for the purpose of illustration and description and that various other forms may be devised within the scope of my invention, as defined in the appended claims.

I claim:

1. A truck of the class described comprising a body member, a plate-like side sill member secured to and arranged on the bottom of said body member at each side thereof, each of said side sill members arranged substantially perpendicularly to the bottom of said body member and extending substantially the length thereof, a laterally offset portion arranged in each of said side sill members above each of the axles of the truck, and a smaller plate-like member similar to the offset portions of said side sill member secured to the bottom of said body member substantially perpendicularly thereto and disposed opposite each of said offset portions in opposition thereto so as to provide a spring and journal box housing therebetween, a plate securely arranged in each of the housings formed between said offset portions of the side sill members and said plate-like members, said plate being disposed substantially parallel to the bottom of said body member and spaced therefrom, and being constructed and arranged so as to provide a seat in the housing for the coil truck springs disposed therein.

2. A truck of the class described comprising a body member, a plate-like side sill member secured to and arranged on the bottom of said body member at each side thereof, each of said side sill members arranged substantially perpendicular to the bottom of said body member and extending throughout substantially the length thereof, a laterally offset portion arranged in each of said side sill members above each of the axles of the truck, a plurality of smaller plate-like members similar to the offset portions of said side sill member arranged on the bottom of said body member and secured thereto with one of said smaller plate-like members disposed opposite each of said offset portions in opposition thereto and substantially perpendicular to the body member, and means for securely holding each of the smaller plate-like members and their respective offset portions of said plate-like side sill members in spaced relation so as to provide a rectangular box-shaped spring and journal box housing therebetween.

3. A truck of the class described as defined in claim 2 wherein the plate-like side sill members and the smaller plate-like members are all securely welded to the body member and respectively to each other so as to provide an integral welded body unit.

4. A truck of the class described comprising a body member, a plate-like side sill member secured to and arranged on the bottom of said body member at each side thereof, each of said side sill members arranged substantially perpendicular to the bottom of said body member and extending throughout substantially the length thereof, a laterally offset portion arranged in each of said side sill members above each of the axles of the truck, a plurality of smaller plate-like members similar to the offset portions of said side sill members arranged on the bottom of said body member and secured thereto with one of said smaller plate-like members disposed opposite each of said offset portions in opposition thereto and substantially perpendicular to the body member, and means for securely holding each of the smaller plate-like members and their respective offset portions of said plate-like side sill members in spaced relation, each of said smaller plate-like members and their respective offset portions of said side sill members being symmetrically arranged so as to provide a rectangular box-shaped spring and journal box housing therebetween with the centers of each of said housings being disposed substantially on the center line of the respective plate-like side sill members.

5. A truck of the class described comprising a body member, a plate-like side sill member secured to and arranged on the bottom of said body member at each side thereof, each of said side sill members arranged substantially perpendicular to the bottom of said body member and extending throughout substantially the length thereof, a laterally offset portion arranged in each of said side sill members above each of the axles of the truck, a plurality of smaller plate-like members similar to the offset portions of said side sill member arranged on the bottom of said body member and secured thereto with one of said smaller plate-like members disposed opposite each of said offset portions in opposition thereto and substantially perpendicular to the body member, and a pair of vertically disposed plates arranged between each of the smaller plate-like members and their respective offset portions of said side sill members, said vertically disposed plates being arranged substantially perpendicular to the body portion of said plate-like side sill members and said smaller plate-like members so as to hold the same securely in spaced relation and to provide a rectangular box-shaped spring and journal box housing therebetween.

6. A truck of the class described comprising a body member, a plate-like side sill member secured to and arranged on the bottom of said body member at each side thereof, each of said side sill members arranged substantially perpendicular to the bottom of said body member and extending throughout substantially the length thereof, a laterally offset portion arranged in each of said side sill members above each of the axles of the truck, a plurality of smaller plate-like members similar to the offset portions of said side sill member arranged on the bottom of said body member and secured thereto with one of said smaller plate-like members disposed opposite each of said offset portions in opposition thereto and substantially perpendicular to the body member, each of said smaller plate-like members being substantially equal in height to that of said plate-like side sill members, and a pair of vertically disposed plates arranged between each of the smaller plate-like members and their respective offset portions of said side sill members, said vertically disposed plates being arranged substantially perpendicular to the body portions of said side sill members and said smaller plate-like members so as to hold the same in spaced relation and to provide a rectangular box-shaped spring and journal housing therebetween.

7. A truck of the class described comprising a body member, a plate-like side sill member secured to and arranged on the bottom of said body member at each side thereof, each of said side sill members arranged substantially perpendicular to the bottom of said body member and extending substantially the length thereof, a laterally offset portion arranged in each of said side sill members intermediate the length thereof above each of the axles of the truck, and a smaller plate-like member similar to the offset portions of said side sill member secured to the bottom of said body member substantially perpendicular thereto and disposed opposite each of said offset portions in opposition thereto, each of said smaller plate-like members and their respective offset portions of said side sill members being symmetrically arranged so as to provide a rectangular box-shaped spring and journal box housing therebetween with the centers of each of said housings being disposed substantially on the center line of their respective plate-like side sill members.

8. A truck of the class described as defined in claim 7 wherein the entire assembly is of a welded construction.

THEODORE N. FRITZSCH.